United States Patent [15] 3,647,362
Head et al. [45] Mar. 7, 1972

[54] POLYESTER CATALYST RECOVERY

[72] Inventors: Gordon Edwin Head; Kenneth Morgan Jones; Eric Gendle, all of Harrogate, England

[73] Assignee: Imperival Chemical Industries Limited, London, England

[22] Filed: Jan. 23, 1970

[21] Appl. No.: 5,372

[30] Foreign Application Priority Data

Jan. 27, 1969 Great Britain..........................4,447/69

[52] U.S. Cl........................................23/22, 23/140, 260/75
[51] Int. Cl. .........................................................C22b 59/00
[58] Field of Search ........................................23/18, 22, 140

[56] References Cited

UNITED STATES PATENTS 3,455,645 7/1969 Kroes..........................................23/22

OTHER PUBLICATIONS

Laubengayer et al., " Journal of the American Chemical Society," Vol. 54, Feb. 1932, pp. 549– 552.

Primary Examiner—Herbert T. Carter
Attorney—Cushman, Darby & Cushman

[57] ABSTRACT

A process for the recovery of germanium dioxide in a form and degree of purity suitable for catalyzing a polycondensation from an ethylene glycol solution of a reaction product of germanium dioxide and ethylene glycol, said ethylene glycol solution containing a proportion of germanium in amount less than that corresponding to a total concentration of 2 percent of germanium dioxide by weight based on the weight of solution, said process comprising the steps of removing ethylene glycol from the said solution by vaporization until the resultant concentrated solution contains a proportion of germanium corresponding to a total concentration of at least 2 percent by weight of germanium dioxide, adding to the resultant concentrated solution a quantity of water equal to at least 34 percent by weight of the germanium (expressed as dioxide) in the resultant concentrated solution, effecting hydrolysis of the compounds of germanium present in the resultant aqueous mixture to germanium dioxide by maintaining the said resultant aqueous mixture at elevated temperature for a time sufficient to effect said hydrolysis, cooling to ensure the separation in the solid state of the germanium dioxide so produced, and isolating the said germanium dioxide.

4 Claims, No Drawings

POLYESTER CATALYST RECOVERY

The present invention relates to the recovery of germanium dioxide from an ethylene glycol solution of at least one germanium compound.

According to the present invention we provide a process for the recovery of germanium dioxide in a form and degree of purity suitable for catalysing a polycondensation in the manufacture of a polyester, from an ethylene glycol solution of at least one germanium compound, said ethylene glycol solution containing a proportion of germanium in the form of at least one compound in amount less than that corresponding to a total concentration of 2 percent of germanium dioxide by weight based on the weight of solution, by the removal of ethylene glycol from the said solution by vaporization until the resultant solution contains a proportion of germanium in the form of at least one compound, corresponding to a total concentration of at least 2 percent by weight of germanium dioxide, adding to the resultant solution a quantity of water equal to at least 34 percent by weight of the germanium (expressed as dioxide) in the resultant solution, effecting hydrolysis of the compounds of germanium present in the resultant mixture to germanium dioxide by maintaining the said resultant mixture at an elevated temperature for an appropriate time, cooling to ensure the separation in the solid state, or to complete the separation in the solid state, of the germanium dioxide so produced and isolating the said germanium dioxide.

The germanium dioxide recovered according to the process of our invention is in a form sufficiently soluble in ethylene glycol at elevated temperatures, for example at the boiling point, to react very readily with ethylene glycol to form a compound of germanium soluble in ethylene glycol under the conditions of polycondensation to form a polyester.

Ethylene glycol solutions from which it is appropriate to recover germanium dioxide according to the process of our invention include ethylene glycol distillates obtained by the condensation of vapor evolved during the polycondensation stage in the manufacture of a polyester based on ethylene glycol and in which a germanium compound is used as catalyst. In this polycondensation process the tendency is for a proportion of the germanium to volatilize in the form of compounds along with excess ethylene glycol evolved as the reaction proceeds.

Germanium dioxide of a higher degree of purity, and therefore more suitable for the production of polyesters of good color, may be obtained if in the recovery process, before the addition of water to the resultant ethylene glycol solution, solid material which separates is removed, and/or if after isolating the germanium dioxide it is washed to remove the low-molecular weight polyester, with for example acetone, methanol or ethylene glycol. We have found ethylene glycol particularly effective in this respect.

As regards the time required to effect the hydrolysis of the germanium compounds after addition of the water to the resultant ethylene glycol solution, we have found that at a temperature of 150° C. 1 hour is a sufficient time to effect the hydrolysis. Within reason, time in excess of that strictly required is not harmful. At lower temperatures a relatively longer time is required than at higher temperatures. Heating at the higher temperatures may require superatmospheric pressure corresponding to the vapor pressure pertaining. It is, of course, necessary to ensure that the condition regarding the proportion of water is achieved and maintained while hydrolysis is effected. Thus, for example, refluxing will normally be resorted to in the case of atmospheric pressure operation and the use of a sealed system in the case of operation under superatmospheric pressure. However, continual addition of water to attain the required proportion of water (free and reacted), or to maintain the required proportion of water, is an alternative method of operation.

The germanium dioxide recovered according to the process of our invention may be used as catalyst for polycondensation, either as isolated and moist with aqueous ethylene glycol, after washing with ethylene glycol with a solvent producing no adverse effect on the polycondensation or after drying.

In order that the process of our invention may the more fully be understood, we give hereinafter examples of methods in which it may be carried out.

EXAMPLES 1 TO 11

Impure ethylene glycol obtained as distillate during the preparation of polyethylene terephthalate was found to contain soluble germanium compounds in total quantity equivalent to a concentration of germanium dioxide of 0.23 percent by weight. From this impure ethylene glycol, ethylene glycol was removed by distillation under a pressure of 300 mm. of mercury until the total content of germanium compounds was equivalent to a predetermined amount expressed as concentration of germanium dioxide by weight. The values chosen for concentration of germanium dioxide are given in Table 1, column 2. To the resultant concentrated solution there was added a quantity of water. The quantity of water added, expressed as percentage by weight on the concentrated solution, is given in column 3 of Table 1. In column 4 the water added is expressed as molecules per molecule of germanium dioxide, and in column 5 as percentage by weight on the germanium dioxide. Column 6 shows the quantity of germanium dioxide recovered expressed as a percentage of that equivalent to the germanium compounds present in the impure ethylene glycol from which the germanium dioxide was recovered.

After addition of the water to the concentrated solution, hydrolysis of the germanium compounds was effected by raising the temperature to 150° C., the pressure rising to about 8 pounds per square inch gauge, and maintaining the mixture at that temperature for 1 hour. After hydrolysis, the temperature of the mixture was lowered to 70° C. and the separated germanium dioxide isolated by filtration.

TABLE 1

| Expt. No. | $GeO_2$ % | $H_2O$ % on mixture | $H_2O$ mols per mol.$GeO_2$ | $H_2O$ % on $GeO_2$ | $GeO_2$ recovery % |
|---|---|---|---|---|---|
| 1 | 4.2 | 7.2 | 10 | 170 | 80.2 |
| 2 | 2.1 | 0.7 | 2 | 34 | 44.2 |
| 3 | 2.1 | 2.1 | 6 | 102 | 68.2 |
| 4 | 1.0 | 0.4 | 2 | 34 | — |
| 5 | 1.0 | 1.3 | 6 | 102 | 23.1 |
| 6 | 1.0 | 1.8 | 10 | 170 | 17.3 |
| 7 | 0.5 | 0.9 | 10 | 170 | 0 |
| 8 | 0.5 | 0.2 | 2 | 34 | 0 |
| 9 | 9.0 | 3.0 | 2 | 34 | 83.8 |
| 10 | 9.0 | 8.6 | 6 | 102 | 76.3 |
| 11 | 9.0 | 13.3 | 10 | 170 | 87.4 |

EXAMPLES 12 AND 13

These examples were carried out exactly according to the description given for Examples 1–11 with the exception that isolation of the recovered germanium dioxide was carried out at a temperature of 90° C. The results are given in Table 2, each column having the same significance as in Table 1.

EXAMPLE 14

An ethylene glycol solution containing 2.4 percent w./w. $GeO_2$ was hydrolysed for 1 hour at 150° C. under reflux conditions at atmospheric pressure in the presence of 10 w./w. water. The solid $GeO_2$ produced was isolated by filtration on a No. 4 grade sintered glass filter at 100° C. The product was washed glycol-free with methanol at 20° C. The recovery yield was 66.2 percent.

EXAMPLES 15–18

For each example an ethylene glycol solution containing 3.5 percent w./w. $GeO_2$ was hydrolysed in the presence of 10 percent w./w. water under the conditions specified in the table. The solid GeO$_2$ produced was isolated by filtration at room temperature on a No. 5 grade sintered glass filter and washed with methanol at 20° C. to remove glycol contamination. The yields and the time and temperature for hydrolysis are given in Table 3.

TABLE 2

| Expt. No. | GeO$_2$ % | H$_2$O % on mixture | H$_2$O mols per mol. GeO$_2$ | H$_2$O % on GeO$_2$ | GeO$_2$ recovery % |
|---|---|---|---|---|---|
| 12 | 5.6 | 2.0 | 2 | 34 | 65.0 |
| 13 | 5.6 | 1.0 | 1 | 17 | 23.0 |

TABLE 3

| Example | Time (hrs.) | Hydrolysis Temp. °C. | Yield (%) |
|---|---|---|---|
| 15 | 1 | 100 | 75.0 |
| 16 | 2 | 100 | 89.5 |
| 17 | 1 | 125 | 86.5 |
| 18 | 2 | 125 | 83.2 |

What we claim is:

1. A process for the recovery of germanium dioxide in a form and degree of purity suitable for catalysing a polycondensation from an ethylene glycol solution of a reaction product of germanium dioxide and ethylene glycol, said ethylene glycol solution containing a proportion of germanium in amount less than that corresponding to a total concentration of 2 percent of germanium dioxide by weight based on the weight of solution, said process comprising the steps of removing ethylene glycol from the said solution by vaporization until the resultant concentrated solution contains a proportion of germanium corresponding to a total concentration of at least 2 percent by weight of germanium dioxide, adding to the resultant concentrated solution a quantity of water equal to at least 34 percent by weight of the germanium (expressed as dioxide) in the resultant concentrated solution, effecting hydrolysis of the compounds of germanium present in the resultant aqueous mixture to germanium dioxide by maintaining the said resultant aqueous mixture at elevated temperature for a time sufficient to effect said hydrolysis, cooling to ensure the separation in the solid state of the germanium dioxide so produced, and isolating the said germanium dioxide.

2. A process according to claim 1 wherein the ethylene glycol solution is a condensate obtained by condensation of vapor evolved during the polycondensation stage in the manufacture of a polyester based on ethylene glycol and in which a germanium compound is used as catalyst.

3. A process according to claim 1 wherein, before the addition of water to the resultant concentrated solution, solid material which separates is removed.

4. A process according to claim 1, wherein, after isolation of the germanium dioxide in solid stage, the germanium dioxide is washed to remove low-molecular weight polyester with acetone, methanol or ethylene glycol.

* * * * *

PO-1050
(5/69)

UNITED STATES PATENT OFFICE
CERTIFICATE OF CORRECTION

Patent No. 3,647,362      Dated  March 7, 1972

Inventor(s)   Gordon Edwin Head, Kenneth Morgan Jones and Eric Gend

It is certified that error appears in the above-identified patent and that said Letters Patent are hereby corrected as shown below:

In the heading opposite "Assignee" change "Imperival" to --Imperial--

Claim 4, line 2 (column 4, line 29 of the patent), change "stage" to --state--

Signed and sealed this 10th day of October 1972.

(SEAL)
Attest:

EDWARD M. FLETCHER, JR.              ROBERT GOTTSCHALK
Attesting Officer                    Commissioner of Patents